United States Patent Office 3,020,354
Patented Feb. 6, 1962

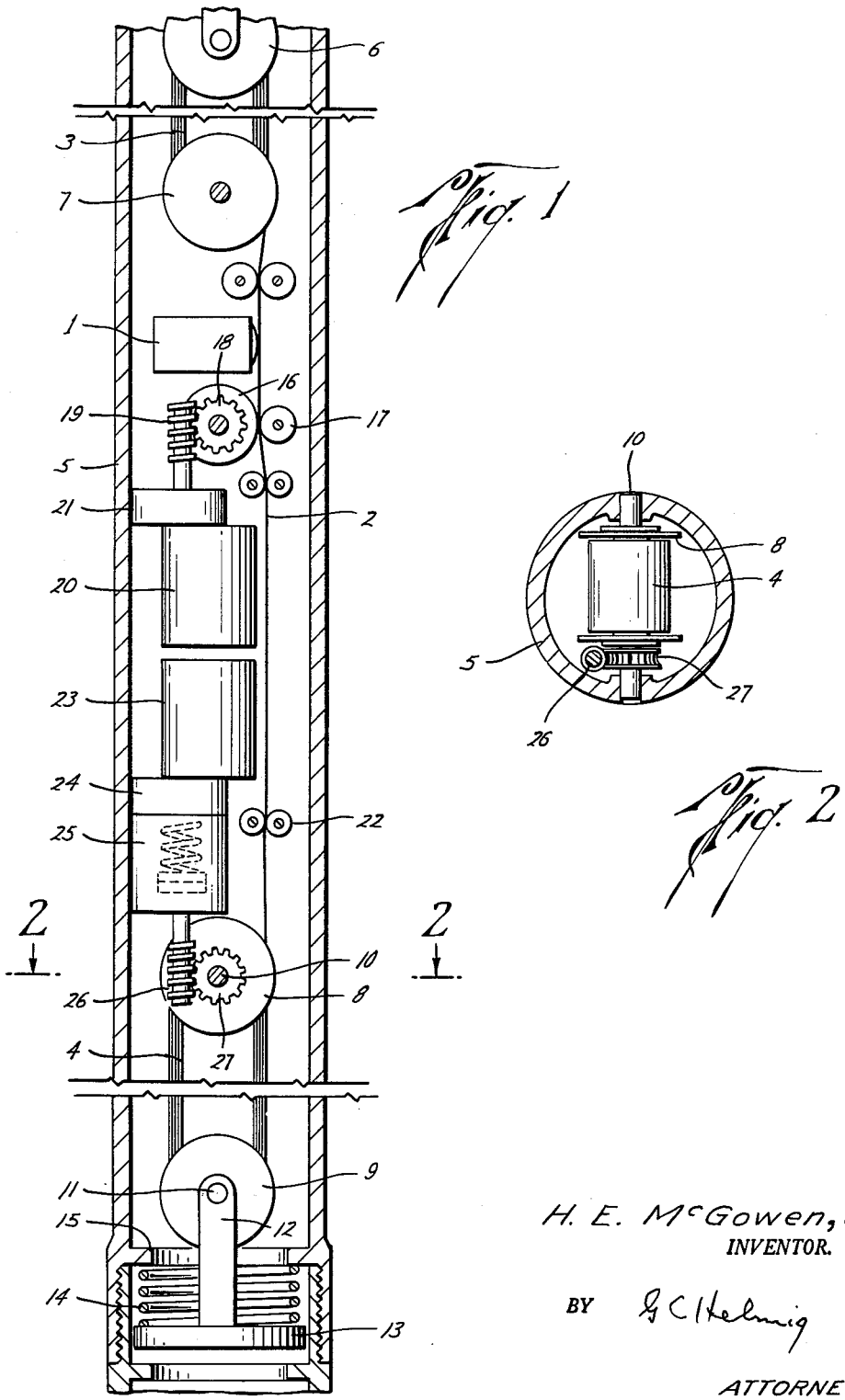

3,020,354
STORING TAPE IN A TUBULAR TAPE RECORDER
Harold E. McGowen, Jr., Houston, Tex., assignor to Camco, Incorporated, Houston, Tex., a corporation of Texas
Filed May 16, 1960, Ser. No. 29,451
3 Claims. (Cl. 179—100.2)

For various working and servicing operations on oil and gas wells, wire line tools are run through the fluid production tubing and sometimes include detection and recording mechanisms through which helpful knowledge concerning downhole conditions is obtained. It is here proposed to employ magnetic recording mechanism for continuously charting signals from a suitable survey detection unit and self-contained with the unit in a longitudinally elongated and relatively small diameter tool whose internal chamber space is constricted by reason of the small size of the well tubing.

An object of the invention is to provide a tool of restricted diameter having in one portion of its length a chamber within which is housed an improved recording assembly whose elements are strung out in longitudinally elongated and transversely narrow compact form to fit a chamber width only slightly greater than magnetic tape width and include a pair of endless traveling belts containing opposite ends of a supply of magnetic tape in superposed loop wrappings on the belts and extending as longitudinally elongated loops in longitudinal tandem succession, each with its major loop axis along the longitudinal center line of the housing chamber whereby to provide an abundance of tape storage capacity within the available small transverse space.

Another object of the invention is to provide for location of multiple magnetic heads to transcribe signal traces in channels across the width of a portion of the tape as it travels from the pay-out belt loop to the wind-in belt loop with tape unwinding and forward feed rolls powered to advance the tape at a constant rate of travel and with power transmitting connections to drive the wind-up loop at a travel rate as great as that of the feed rolls and thereby eliminate slack in the tape.

Additional objects will become apparent from the following specification having reference to the accompanying drawing wherein FIG. 1 is a longitudinal vertical section of a fragment of a well tubing inspection device illustrating a preferred embodiment of the invention and FIG. 2 is a transverse section on line 2—2 of FIG. 1.

Signal sending mechanism per se forms no part of the present invention and therefore is not illustrated in the drawing. It may consist of various surveying devices including, for example, a well tubing caliper whose measurements are telegraphed through circuitry to a stack of magnetic recording units arranged in side by side relation in an assembly unit indicated at 1 in the drawing. An intermediate length of a magnetic recording strip 2 passes over the bank of recording heads 1 for receiving the signals in transversely spaced zones or channels across the width of the strip. Opposite ends of the recording strip are secured to upper and lower endless belts 3 and 4 which receive superposed wrappings of the recording tape strip 2.

The tape storage belts 3 and 4 each consists of a flexible belt of longitudinally elongated loop form and they have their return bends entrained on suitable spools or guide rollers mounted to rotate on transverse shafts which, as shown in the drawing, intersect the longitudinal axis of the housing enclosure 5. The several guide rollers are longitudinally spaced apart with one pair above and the other below the recording head assembly 1 and the pair of longitudinally spaced apart rollers for the upper belt 3 are indicated at 6 and 7 and the longitudinally spaced apart lower pair are indicated at 8 and 9. The axle shaft 10 for the roller 8 is mounted in diametrically opposite portions of the housing 5 on a fixed axis while the shaft 11 for the roller 9 has its opposite ends mounted in a pair of longitudinally extending arms 12 terminating in a piston-like head 13 longitudinally movable within the housing 1 and biased in a direction away from the shaft 10 by means of the compression coil spring 14 interposed between the head 13 and an internal flange or shouldered seat 15 on the housing 5. The biasing spring 14 is provided to maintain the belt under tension, both to compensate for slack in the belt 4 and to insure traction drive relation with the roller 8. A similar mounting and belt slack take-up arrangement is proposed for the rollers 7 and 6 respectively, whose belt 3 stores the recording tape for payoff travel during a recording operation.

For effecting travel of the tape across the recording unit 1, a pair of friction drive rollers 16 and 17 are mounted in the housing to engage opposite faces of the tape adjacent the recording unit 1 and the drive roller 16 has fixed thereto a gear wheel 18 in mesh with a worm 19 to be driven from a constant speed electric motor 20, preferably through reduction gearing contained within a gear box 21. This motor and its drive gearing are mounted within the housing 5 in laterally offset relation to the longitudinal center line of the housing to provide abundance of clearance space within the housing for the travel path of the recording tape. The constant rate of travel of the tape across the recording head insures uniformity of records in timed sequence.

One or more pairs of idler guide rolls 22 are provided to define the path of the tape as it travels from the unwinding belt 3 to the wind-up belt loop 4. The latter is positively driven in the wind-up direction by means of power supplied from a small electric motor 23 whose speed of rotation is at least as great as that of the feed motor 20. Transmission of power from the wind-up motor 23 is through a gear reduction box 24, a clutch unit 25, a worm 26 and a worm wheel 27 secured to the belt guide roller 8. The clutch unit 25 provides for slippage of power transmitted and may consist of a spring biased disc splined on the drive shaft from the gear reduction unit 24 for face to face contact with a companion disc keyed to the shaft of the worm 26. Slippage of the clutch parts prevents excessive tension on the tape as it travels beyond the feed rollers 16 and 17 and is wound in ever increasing layers on the wind-up belt loop 4. The wind-up drive motor 23 and its power train are mounted within the housing 5 in laterally offset relation to the housing center line and in correspondence to the offset of the tape feed motor 20.

The arrangement of parts as described is such as to accommodate a tape width and its storage and travel across the magnetic recording mechanism within the limited space available in a downhole well tool whose transverse dimension needs to be constricted for co-operation with the wall of a well production tubing string. The several components are arranged in longitudinal tandem succession within the hollow body of the tool and the longitudinally elongated tape storage belts mounted with their major axis substantially coincident with the housing center line affords a maximum storage capacity for the relatively wide tape needed for multiple channel recordings.

In the event a particular tool assembly of which the recording mechanism is a part, is of a type as not to be sealed against entrance of liquid and moisture or dirt laden air, the tape and its co-operating components may be suitably encapsulated within protective sheathing.

Such variant and other modifications may be made without departure from the invention as set out in the attached claims.

What is claimed is:

1. In a magnetic tape recorder, a relatively narrow and longitudinally elongated hollow housing, two endless belts each in the form of a longitudinally elongated loop positioned within the housing in longitudinal tandem succession to one another with the major loop axis at the longitudinal center line of the housing and each belt of a width to occupy the major portion of the interior width of the hollow housing, said looped belts being adapted to receive and store in superposed layers a magnetic tape which reaches from one belt to the other and is wound up on one as it is fed from the other, a magnetic recording head mounted in the housing to operate on the tape reach portion between the belts, power driven tape engageable feed means operating at a constant rate to feed tape to the recording head and drive transmitting means having a slip clutch connection with the wind-up belt and driving the same at a rate to maintain tension on the tape beyond said feed means.

2. In a magnetic tape recorder, a relatively narrow and longitudinally elongated hollow housing, two endless belts each in the form of a longitudinally elongated loop positioned within the housing in longitudinal tandem succession to one another with the major loop axis at the longitudinal center line of the housing and each belt of a width to occupy the major portion of the interior width of the hollow housing, said looped belts being adapted to receive and store in superposed layers a magnetic tape which reaches from one belt to the other and is wound up on one as it is fed from the other, a magnetic recording head mounted in the housing to operate on the tape reach portion between the belts, guide rollers fitted within the loop return bends of both belts and mounted in the housing on transverse axes intersecting the housing center line, resilient means active on one roller of each pair for the respective belts to bias the roller longitudinally away from its companion roller and maintain the belt under tension and power drive means connected to the other roller of the wind-up belt for rotating the same in tape windup direction.

3. A magnetic tape recorder, a relatively narrow and longitudinally elongated hollow housing, two endless belts each in the form of a longitudinally elongated loop positioned within the housing in longitudinal tandem succession to one another with the major loop axis at the longitudinal center line of the housing and each belt of a width to occupy the major portion of the interior width of the hollow housing, said looped belts being adapted to receive and store in superposed layers a magnetic tape which reaches from one belt to the other and is wound up on one as it is fed from the other, a magnetic recording head mounted in the housing to operate on the tape reach portion between the belts, two pairs of guide rollers fitted one within opposite loop return bends of one belt and the other within opposite return loop bends of the other belt, means rotatably mounting said rollers within the housing on transverse axes at the longitudinal center line of the housing, power transmitting means connected with one of the rollers of the tape wind-up belt to drive the same in the windup direction and constant speed tape engageable drive means at the pay-out end of the feed belt.

References Cited in the file of this patent
UNITED STATES PATENTS

| | | |
|---|---|---|
| 1,312,172 | Frank | Aug. 5, 1919 |
| 2,479,518 | Scherbatskoy | Aug. 16, 1949 |